Patented Jan. 3, 1939

2,142,510

UNITED STATES PATENT OFFICE 2,142,510

EGG MATERIAL

Benjamin R. Harris and Marvin C. Reynolds, Chicago, Ill.; The First National Bank of Chicago and Lulu E. Reynolds, executors of Marvin C. Reynolds, deceased, assignors to The Emulsol Corporation, Chicago, Ill., a corporation of Illinois No Drawing. Application November 12, 1934, Serial No. 752,710

23 Claims. (Cl. 99—196)

Our invention relates to improved egg material together with uses thereof.

The principal object of the invention is the provision of an improved egg material particularly adapted for use as an emulsifying agent and general interface modifier.

Another object is the provision of an improved egg material adapted for use in the preparation of cake batters.

Other objects and features of the invention will be apparent from a consideration of the following detailed description.

We have discovered a new and improved egg material having new and improved colloidal and emulsifying properties which render it particularly well adapted as an emulsifying agent in many industries where egg yolk and similar emulsifying agents are customarily used. The material imparts many valuable properties to a cake batter and is particularly well suited for use in this capacity.

Generally speaking, whole mixed eggs contain approximately one-third of yolk and two-thirds of whites. The yolk material contains about 50% of moisture and 50% of solids, and the white material contains approximately 12½% of solids, and the rest is moisture. The solid material of whole eggs is composed of various types of proteins having various properties, as well as lecithin material and fats. The white is composed of complex albuminous substance, a small proportion of ash material, and traces of sugar of less than ½%. The moisture in the whole egg is partially bound with the solids and is partially in a free state.

On freezing such ordinary mixed eggs and then thawing them out, clumping takes place, and a proportion of the liquid oozes out and the egg material is changed in its colloidal properties.

We have discovered that by adding to egg material a proportion of a modified glycerine or glycerol ether having at least one free glycerol hydroxy group, the colloidal properties of the egg material are altered in that the modified glyceride or the like changes the surface tension characteristics of the egg material and produces a product with increased viscosity and with improved emulsifying properties when used for example in cake batter emulsions and in other ways as will be pointed out.

We have also discovered that if the egg material treated with a proportion of modified glycerides or the like having at least one free hydroxy group is frozen and kept in a frozen condition until ready for use and then subsequently thawed out, the thawed product will be more viscous than the unfrozen egg material and the separation of free moisture will be reduced. The modified glycerides or the like which we use may be liquid, plastic, or substantially solid at ordinary room temperatures. On account of the ease of incorporation, there is some advantage in the use of modified glycerides or the like which are substantially liquid at ordinary temperatures; but modified glycerides or the like of a semi-solid or solid consistency are used to good advantage by forming a paste thereof with water and then adding egg material to the paste by continuous stirring or rubbing, by the use of a colloid mill, by grinding, or in other ways to produce a homogeneous dispersion.

The freshly prepared emulsion of egg material and modified glycerides or the like may be used without further treatment. The product, however, is preferably frozen and kept in a frozen condition below the temperature of decomposition until ready for use, after which it is thawed by allowing it to stand at substantially room temperature for a sufficient period of time.

When the modified glyceride or the like is added to egg whites alone, it is preferable to make a paste by adding the whites gradually to the modified glyceride or the like. The product may be stirred and agitated to some considerable extent as the egg whites do not foam as much during agitation as normally.

The modified glycerides or the like used in accordance with our present invention may be relatively pure substances, but preferably are mixtures, the fatty acyl or alkyl groups present being of relatively high molecular weight and corresponding in general to the fatty acids found normally in edible oils and fats of commerce. The modified glycerides or the like not only may be mixtures insofar as the fatty acyl or alkyl radicals are concerned, but they may comprise as well, for example, mixtures of mono- and diglycerides or they may consist either substantially entirely of mono-glycerides or di-glycerides. The greater the number of hydroxy groups, the less of the modified glyceride or the like is required in the egg mixture to produce the desired results. Everything being equal, therefore, considerably less mono-glyceride is required than di-glyceride to have the same effect.

Examples of methods that may be employed in producing the modified glyceride are as follows:

*Example 1*

50 parts of mixed fatty acids derived from cotton seed oil are mixed with 25 parts by weight of glycerine and heated with constant stirring at approximately 220° C. for between two and three hours. A current of inert gas such as carbon dioxide is bubbled through the mixture during heating and the reaction allowed to continue until the free fatty acids drop down to about ½% or less. The product produced consists substantially of a mixture of mono-glycerides, with some unreacted glycerine. The excess of glycerine is drawn off from the product, which is in the form of a supernatant layer and the product is further purified if desired.

*Example 2*

A mixture of di-glycerides may be formed by heating 100 parts of the above product with 80 parts of cotton seed oil fatty acids at a temperature of about 240° C. for from two to three hours in the absence of air until the free fatty acid content is between approximately ½ and 1%.

*Example 3*

200 parts of corn oil are heated in an inert atmosphere or in a vacuum under reflux with 80 parts of glycerine and about 0.2 part of sodium hydroxide as a catalyst. The temperature is brought up to about 250° C. and kept at approximately this temperature for about two hours with stirring. The mixture is then allowed to cool and stand to permit excess glycerine present to settle as a bottom layer. The excess glycerine is then drawn off and the product may be still further purified, if desired. The product produced is a mixture of mono- and diglycerides having free hydroxy groups.

*Example 4*

300 parts of hydrogenated cotton seed oil, with a melting point of approximately 102° F., are heated in a non-oxidizing atmosphere or in a vacuum under reflux with 120 parts of glycerine and about .3 part of sodium hydroxide. The temperature is raised to about 260° C. and kept approximately at this point for about two hours with stirring. The reaction mixture is then allowed to remain at rest, to cool and to permit the surplus of glycerine to settle out as a layer at the bottom. The excess glycerine is drawn off. The product may be deodorized, decolorized or otherwise treated to purify it. It consists of a mixture of glycerides with free hydroxy groups.

*Example 5*

1000 parts of distilled and deodorized fatty acids, derived from a partially hydrogenated cottonseed oil with an iodine number of approximately 85 to 80, are heated with 700 parts of glycerine, at 220° C. with continuous, vigorous stirring for two hours. A rapid stream of $CO_2$ is kept bubbling through the liquid. The $CO_2$ helps to prevent oxidation and assists in carrying off moisture. The reaction mixture is allowed to remain at rest in an atmosphere of $CO_2$, and the lower layer of unreacted glycerol is drawn off. The product consists principally of glycerides with free hydroxy groups, essentially monoglycerides, and may be deodorized or further purified if desired.

The examples given above are by no means exhaustive of either the types of modified glycerides or the like used with our invention or methods employable for the production of such modified glycerides or the like. We may, for example, employ as a source of fatty acid a substantially pure material such as stearic acid and other fatty acids available or capable of being made available as regular articles of commerce. In this case, a substantially pure mono- or diglyceride product may be produced. When the process employed is one of esterification, therefore, any suitable type of fatty acid or mixtures may be employed. When the process is one of re-esterification, any of the usual oils and fats of commerce may be employed, care being used to select only products of an innocuous and edible character when the egg material is to be used as an article of food. Lard is used with good results as a material capable of treatment by re-esterification to produce products employed in accordance with our present invention. We may also prepare a mixture of mono- and di-glycerides by partially saponifying a triglyceride and then decomposing the soap formed as a result of the partial saponification, leaving a product consisting essentially of modified glycerides with free hydroxy groups, a proportion of free fatty acids, and a salt. The salt may be allowed to settle out or it may be allowed to remain, in which case the process should be carried on in such a manner as to produce a salt which can be used to advantage or which at least is not objectionable.

As an example, we may take 500 parts of hydrogenated cotton seed oil (melting point about 120° F.) and heat the same to a temperature of 220° C. To this is added with constant stirring a eutectic mixture of 12½ parts of caustic soda and 17½ parts of caustic potash, also melted and kept at a temperature of 220° C. Vigorous stirring is continued for ten minutes. The molten mixture is then cooled to about 170° C. and poured gradually with stirring into approximately its own weight of water at 70° C. This produces a paste which is then cooled down to about 40° C. and treated with 47 parts of concentrated hydrochloric acid diluted with 90 parts of water to substantially completely decompose the soap. The resultant product is a paste containing modified glycerides having free hydroxy groups, free fatty acids, and a proportion of sodium and potassium chloride. This paste may be incorporated in the egg material or the paste may be dehydrated in whole or in part to produce a partially or entirely dehydrated product capable of being used to advantage in egg material in accordance with the present invention.

In carrying out this latter process, any suitable alkali saponifying agent can be used and any relatively strong acid employed to decompose the soap. The use of caustic soda as a saponifying agent and hydrochloric acid as an agent to decompose the soap has the advantage of producing sodium chloride which in itself can be used to advantage in egg materials and is moreover a material normally present in cakes and other food materials in which the eggs may be used. The mixture of modified glycerides with free hydroxy groups and free fatty acids can be produced by carrying on both the saponification and decomposition of the soap in substantially anhydrous media. We have found that the use of relatively small amounts of free fatty acid in cake batters is of some advantage in producing an improved cake, particularly when a so-called white cake is produced and in which the egg material employed is egg whites rather than egg yolks or whole eggs.

Examples of modified glycerides or the like which can be used with good results in the practice of the present invention are as follows:

Monostearyl glycerol
    Mono-palmitic acid ester of glycerol
    Monocetyl ether of glycerol
    Monomyristyl glycerol
    Mono-oleyl glycerol
    Monomyristyl ether of glycerol
    Monolinoleyl glycerol
    Monohydroxystearyl glycerol
    Myristyl oleyl glycerol
    Dioleyl glycerol
    Oleyl palmityl glycerol In addition to the relatively pure substances listed, mixtures thereof formed by either esterification of fatty acids with glycerine or re-esterification of oils and fats with glycerine are also examples. The characteristics of the examples given are similar in that they have certain factors in common. All are derivatives of glycerol with at least one relatively high molecular weight fatty acyl or alkyl radical and at least one free glycerol hydroxy group. The fatty acyl or alkyl radical or radicals impart to the molecule as a whole oily or fatty characteristics, but in each case the molecule has definite hydrophillic character imparted thereto by the presence of the hydroxy group or groups. Besides being similar in chemical structure and behavior, they are similar in function when employed in accordance with the present invention in egg material.

In selecting a modified glyceride or the like to use in accordance with the present invention, consideration must be given to the number of hydroxy groups present as compared to the number and kind of fatty acyl or alkyl radicals. Thus, for example, a mono-glyceride is definitely more hydrophillic than a di-glyceride. As a specific example, from seven to ten per cent of the material of Example 1 is used to good advantage in combination with egg material to produce an improved composition in accordance with the present invention having definite advantages in the preparation of cake batters of the type wherein the proportion of both the aqueous liquid and sugar is greater than the proportion of flour. If, however, the reaction mixture of Example 2 is employed, from 25 to 30% thereof is required if the same result is to be obtained as that achieved when the material of Example 1 is used. When employing materials wherein a mixture of mono- and di-glycerides is present, the amount to be used is determined by a consideration of approximately the relative proportion of mono- and di-glycerides, it being understood that some experimentation may be required if a process of manufacture is employed which results in a mixture, the approximate composition of which is not known. When the material containing a proportion of free fatty acid is used, the amount employed in the egg material should be approximately on the basis of the amount of modified glyceride or like material present, although the free fatty acid has some hydrophillic effect.

As hereinabove related, a suitable way of introducing the modified glyceride or like material is in paste form. Those materials which are liquid or semi-liquid at ordinary room temperatures are readily dispersed in water or other aqueous material such as egg whites to form a paste. Those materials which are relatively solid at ordinary room temperature may also be emulsified with water to form a paste, a convenient method being to form the paste at an elevated temperature at which the modified glyceride or the like is liquid and allow the paste to cool while stirring. In general, we prefer to use substances which are not definitely solid at ordinary room temperatures for the reason that dispersion is somewhat facilitated and in most cases grinding is not required to insure the user of thorough dispersion.

In treating eggs, we take the egg meat out of the shell and discard all eggs which are unfit for edible purposes. 279 pounds of the egg meat are introduced into a large container fitted with a mixing device, and 21 pounds of the reaction mixture of Example 1 are added with constant stirring until a homogeneous mixture is obtained.

Another example: The modified glyceride or the like may also be added by mixing first a portion of the eggs with the modified glyceride or the like in a paste and then emulsifying the rest of the egg material in the paste by constant mixing or stirring.

Another example: We can carry out the subject matter of this invention by varying the amount of whites in the egg mixture. Thus we can add more whites to the egg mixture and then add our modified glyceride or the like to it, or add more yolks, or we can separate the yolks from the whites in such a manner as to have either the whites by themselves or a mixture of yolks and whites wherein the portion of yolks is greater than the portion of whites.

In using these eggs, whether in a frozen or non-frozen condition, in preparing a cake batter, they offer certain advantages in that a cake batter may be produced with a larger proportion of moisture such as milk and a correspondingly larger proportion of sugar than usually used in a cake batter (without using more egg yolk), without impairing the volume of the cake, and with a decided improvement in the tenderness and general texture characteristics of the cake. In such cakes the proportion of sugar and the proportion of moisture, respectively, exceed the proportion of flour. Also by virtue of the additional moisture content and of the colloidal condition of the moisture, such cake has considerably enhanced resistance to staling.

The modified glyceride or similarly treated egg material has many other advantages in that, when frozen and thawed, it is a smooth mass with increased viscosity, with improved emulsifying value. Whether used before freezing or after freezing, in a cake batter, it makes an improved smooth cake batter; it enhances the emulsification and dispersion of the other ingredients used in the cake batter.

With the treated eggs of the above invention, it is possible to produce a more tender cake with longer keeping qualities by increasing the liquids in the formula, as well as the sugar. From 30% to 60% more liquids, such as milk and eggs, may be used and from 10% to 35% more sugar than usually is used in commercial practice. It also makes possible the use of the ordinary creaming method where the ordinary shortening, such as partially hydrogenated cottonseed oil, is creamed together with the sugar to incorporate a certain amount of air before the other ingredients are added.

The usual modified glyceride or the like introduced in a shortening, such as partially hydrogenated cotton seed oil of 100 to 102° F. melting point, reduces considerably the smoking point of the shortening, and for this reason, while it is suitable for baking purposes, it is not suitable for deep frying of such a product as doughnuts, and the baker usually needs two types of shortening. If, however, the modified glyceride or like treated egg is used in baking, the ordinary hydrogenated shortening may be used, which is suitable for both baking and frying purposes.

It is not to be inferred that our invention is limited to any particular type of egg material, that is, mixed eggs, yolks and/or whites. When the egg material of our invention is used in making a conventional type of cake, ordinary whole eggs are used with goods results. The invention contemplates the use of yolks substantially alone, however, or whole eggs, whites, and/or mixtures thereof, depending upon the specific use to which the product is to be put.

Generally speaking, the advantages of this invention consist not only in producing an improved egg material with specific colloidal properties, increased viscosity and better emulsifying value, but also with additional properties which affect advantageously the process of cake baking when these eggs are used in a cake batter.

We do not limit this invention to a specific method of making cake. In fact, any suitable process may be used and both additional liquids as well as additional sugar may be added without any substantial increase in baking powder to produce a cake of improved quality.

We do not limit our invention to the use of the modified glycerides or the like enumerated hereinabove, but the invention may use all edible modified glycerides or the like containing free or unesterified glycerol hydroxy groups. For example, we may use a mixture of fatty acids derived from lard and esterify such fatty acids with an excess of glycerine to produce a mixture of mono- fatty acid esters of glycerine containing free hydroxy groups. In place of lard, we may also use substantially any of the edible oils or fats of commerce as a source of fatty acids, producing the products used in accordance with the present invention either by esterifying the fatty acids of any particular oil or fat with glycerine, or by re-esterification of the oil or fat with glycerine in the manner described.

Beside the modified glyceride or the like, we may also add other modifying agents which have been used heretofore, such as, in the case of mixed eggs, for example, we may add a small proportion of salt, about ¼ to 1%, or we may introduce cane sugar, dextrose or glycerine, gelatin, other proteins, hydrophillic carbohydrate colloids such as gelatinized starch, gum arabic, gum tragacanth, Iceland moss, agar agar, and the like. We may further modify our egg mixture by the introduction of small proportions of edible acids such as tartaric or citric acids, about $\frac{1}{10}$%. The addition of these agents to the egg mixture containing the modified glyceride or the like further modifies the composition to produce a product which further modifies the colloidal properties of the egg mixture to produce a product which does not resemble, either in physical consistency or in colloidal properties, an egg product treated with modified glycerides or the like by themselves, nor with the addition agents by themselves. We have already described a method of producing modified glycerides wherein a proportion of free fatty acids and salts are formed at the same time. Such a material as already noted can be used with good results.

The modified glyceride or like egg product which may be either egg whites, yolks, whole eggs, or egg material containing varying amounts of egg yolks without the preserving ingredients mentioned, may be preserved for long periods until ready for use by freezing at low temperatures, such as temperatures usually maintained in commercial cold storage warehouses for freezing eggs and keeping them below temperatures of decomposition. Such temperatures are, for example, from about +5 to −10° F., depending on the nature of the egg product. When ready for use, the product is thawed out.

As previously noted, the product of this invention may be used in many foods, such as cake batters, where fatty constituents such as animal or vegetable oil are used in aqueous dispersion. The colloidal properties of our treated egg material, however, make it suitable for many other technical purposes where emulsification is important. Thus it may be used as a base to emulsify oil, fats, sulphonated oils, etc., used in the leather industry and many other industries. The product may also be used in cosmetics in combination with olive oil and sulphonated oil, for example, together with antiseptics and other usual ingredients.

In the case of some of our egg compositions, particularly in certain instances where the egg material consists solely of egg whites, there is apt to be, in a small degree, a certain lack of homogeneity which, though it does not interfere with the effectiveness of the composition in baking, it is desirable to eliminate from the standpoint of general appearance. We have found that a very effective way of accomplishing this is to incorporate a small proportion, from $\frac{1}{10}$% to ½% or ¾% of a hydrophillic material of the class exemplified by the illustrations given hereinabove, although larger proportions may also be used in many cases. The hydrophillic gums are very satisfactory for this purpose. In general, it is convenient to disperse the hydrophillic gum or other hydrophillic colloid in warm, hot or boiling water, and then use this hot dispersion to form a paste of our glycerides or the like with hydroxy groups; or alternatively a finely divided carbohydrate colloid may be first coated with our modified glycerides or the like and subsequently dispersed in warm or hot water to form the desired paste. An illustrative example of carrying out this form of the invention is as follows:

To 30 parts of the modified glyceride (prepared as described in Example 4) maintained in a molten condition at a temperature of approximately 60° C., add with stirring one part of finely powdered gum tragacanth. To this mixture, with continuous stirring, add gradually 19 parts of water previously warmed to approximately 60° C. Stir until the mixture is cooled to approximately room temperature. A substantially white paste of substantial consistency is thus obtained. 60 parts of egg whites are then gradually added, while mixing, in a slow speed mixer to the 50 parts of paste prepared hereinabove and mixed for approximately ½ minute at moderate speed. 210 parts of additional whites are then added and the mixing continued for another ¾ of a minute. The product consists of 320 parts of our improved egg white composition which may be used as such or may be frozen and kept in cold storage, to be thawed out when desired for use. A similar method may be used when whole eggs are used, or for that matter, if the product should consist essentially of egg yolks.

What we claim as new and desire to protect by Letters Patent of the United States is:

1. A composition consisting essentially of egg material and a proportion of a derivative selected from the group consisting of higher molecular weight alkyl and acyl derivatives of glycerine, said derivative having at least one free glycerine hydroxy group.

2. A composition consisting essentially of egg material and a proportion of a mixture of higher molecular weight fatty acid esters of glycerine, wherein each of the constituent esters of the mixture has at least one free glycerine hydroxy group.

3. A composition consisting essentially of egg material and between approximately seven and ten per cent of a relatively high molcecular weight fatty acid ester of glycerine, said ester having at least one free glycerine hydroxy group.

4. A composition consisting essentially of egg material and a proportion of a mixture of modified glycerides with free hydroxy groups resulting from the re-esterification with glycerine of a triglyceride material.

5. A composition consisting essentially of egg material and a proportion of a mixture of modified glycerides with free hydroxy groups resulting from the esterification of a mixture of fatty acids derived from an oil or fat of commerce, with an excess of glycerine.

6. A composition consisting essentially of egg material, a relatively small amount of relatively high molecular weight free fatty acids, and a proportion of a derivative selected from the group consisting of higher molecular weight alkyl and acyl derivatives of glycerine, said derivative having at least one free glycerine hydroxy group.

7. A composition consisting essentially of egg yolk and a proportion of a higher molecular weight fatty acid ester of glycerine, said ester containing at least one free glycerine hydroxy group.

8. A frozen egg product consisting essentially of egg material and a proportion of a relatively high molecular weight fatty acid ester of glycerine containing at least one free glycerine hydroxy group.

9. A frozen egg product consisting essentially of egg material and a proportion of a mixture of higher molecular weight fatty acid esters of glycerine, wherein each of the constituent esters of the mixture has at least one free glycerine hydroxy group.

10. A frozen egg product consisting essentially of egg material and between approximately seven and ten per cent of a relatively high molecular weight fatty acid ester of glycerine, said ester having at least one free glycerine hydroxy group.

11. A frozen egg product consisting essentially of egg material and a proportion of a mixture of modified glycerides with free hydroxy groups resulting from the re-esterification with glycerine of a triglyceride material.

12. A frozen egg product consisting essentially of egg material and a proportion of a mixture of modified glycerides with free hydroxy groups resulting from the esterification of a mixture of fatty acids derived from an oil or fat of commerce, with an excess of glycerine.

13. A frozen egg product consisting essentially of egg material, a relatively small amount of relatively high molecular weight free fatty acids, and a proportion of a higher molecular weight fatty acid ester of glycerine, said ester having at least one free glycerine hydroxy group.

14. A frozen egg product consisting essentially of egg yolk and a proportion of a higher molecular weight fatty acid ester of glycerine, said ester having at least one free glycerine hydroxy group.

15. A composition consisting essentially of egg material and a proportion of a higher fatty acid ester of glycerine with at least one free glycerine hydroxy group, said composition being frozen and maintained in a frozen condition until ready for use.

16. A composition consisting essentially of egg material, a proportion of a higher molecular weight fatty acid ester of glycerine, said ester having at least one free glycerine hydroxy group and a hydrophillic colloid material.

17. A composition consisting essentially of egg material, a hydrophillic vegetable gum, and a proportion of a higher molecular weight fatty acid ester of glycerine, said ester having at least one free glycerine hydroxy group.

18. A composition consisting essentially of egg material, a hydrophillic material of a class consisting of salt, sugar, glycerine, gelatin, proteins, hydrophillic carbohydrate colloids, gum arabic, gum tragacanth, Iceland moss, and agar agar, and a proportion of a member selected from the group consisting of higher molecular weight monoglycerides and higher molecular weight diglycerides, and mixtures thereof.

19. A composition consisting essentially of egg material, a small proportion of an edible acid, and a small proportion of a higher molecular weight fatty acid glyceride having at least one free glycerine hydroxy group.

20. An egg product comprising frozen egg material and having added thereto a substance selected from the class consisting of glyceryl mono-stearate, glyceryl distearate, and mixtures thereof.

21. An egg product comprising frozen egg yolk material and having added thereto a substance selected from the class consisting of glyceryl mono-stearate, glyceryl distearate, and mixtures thereof.

22. An egg product comprising frozen egg material and having added thereto a substance selected from the class consisting of glyceryl mono-acid esters of higher fatty acids, glyceryl di-acid esters of higher fatty acids, and mixtures thereof.

23. An egg product comprising frozen egg yolk material and having added thereto a substance selected from the class consisting of glyceryl mono-acid esters of higher fatty acids, glyceryl di-acid esters of higher fatty acids, and mixtures thereof.

BENJAMIN R. HARRIS.
MARVIN C. REYNOLDS.